April 29, 1941.     L. B. BERG     2,239,950
FILTER
Filed March 3, 1938
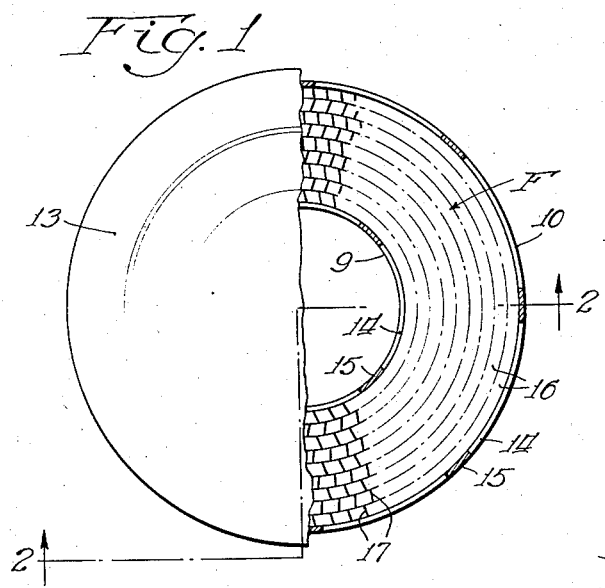
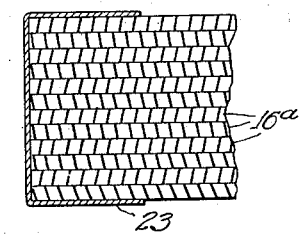
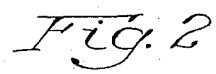
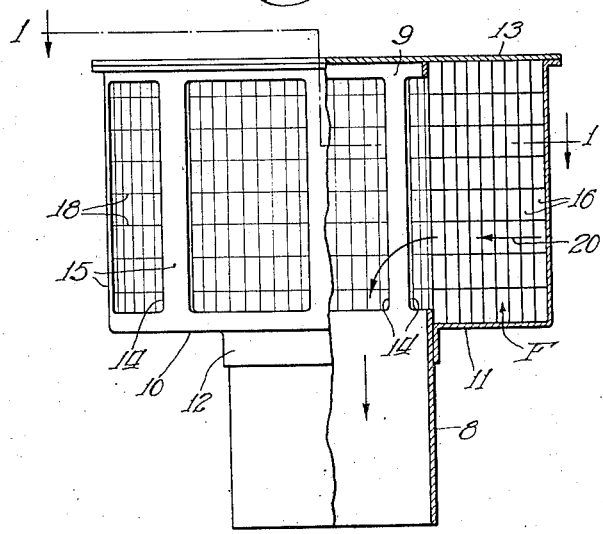
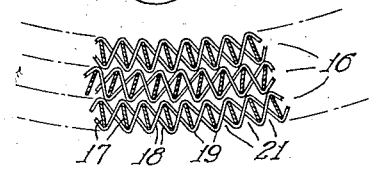
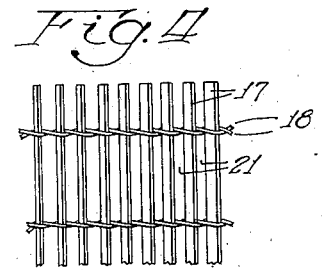
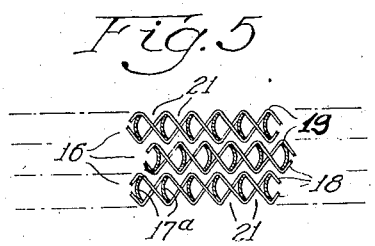
Inventor:
Louis B. Berg
By: Edward C. Fitzbaugh
Atty.

Patented Apr. 29, 1941

2,239,950

UNITED STATES PATENT OFFICE 2,239,950

FILTER

Louis B. Berg, Chicago, Ill., assignor to Borg-Warner Corporation, Chicago, Ill., a corporation of Illinois Application March 3, 1938, Serial No. 193,697

2 Claims. (Cl. 183—75)

My invention relates to fluid filters and has as its object to provide an improved filter having a higher ratio of foreign matter-arresting and fluid-transmitting capacity than is characteristic of filters now available.

An outstanding characteristic of the invention is the provision of a filter in which the interstices are of uniform size and uniformly arranged. In conventional air filters, such, for example, as those used in motor vehicles, the filtering material is commonly produced by corrugating a flat sheet of material with two series of corrugations crossing each other transversely, and the resulting crinkled or corrugated surface is not uniform in texture, and when arranged in multiple layer formation, produces air passages which are not uniform in size or arrangement. Filters produced by other methods are also characterized by non-uniformity of their air passages.

The foreign matter-arresting efficiency of a filter depends upon closeness of spacing of the material forming the fluid passages. Fluid transmitting capacity, or porosity, on the other hand, depends in general upon the ratio between the cross sectional area of the air passages and the corresponding cross sectional area of the material in which the passages or interstices are formed.

The present invention, therefore, has as its primary object to provide a filter having maximum foreign matter-arresting ability and porosity, as a result of substantially complete uniformity in the size and arrangement of fluid passages in a multiple layer filtering material.

Another object of the invention is to provide a filter which is extremely durable, will retain its uniformity of texture indefinitely under severe conditions of usage, and which may be renovated by washing or other form of cleaning so as to restore it to its original efficiency without in any way impairing its uniformity of texture.

Another object of the invention as applied to an air filter of the annular type, such as is used in motor vehicles, is to provide a filter combining the advantages of a multiple layer fabric filtering material with those of a filter having a vortical action tending to speed up the passage of air through the filter.

Other objects, the advantages and uses of the invention will become apparent after reading the following specification and claims, and after consideration of the drawing forming a part of the specification, wherein:

Fig. 1 is a plan view, partly in section, of an air filter of a type used in connection with motor vehicle engines, embodying the invention;

Fig. 2 is a side elevation, partly in section, of the same;

Fig. 3 is an enlarged detail sectional view of a portion of the filtering material of my invention;

Fig. 4 is a side elevation of a portion of one layer thereof;

Fig. 5 is a sectional view similar to Fig. 3 of a modified form of the filtering material embodied in my invention; and Fig. 6 is a sectional view through a portion of a flat type filter embodying the invention.

In the illustrative embodiment of the invention shown in Figs. 1, 2 and 3, I have shown a filter having the general form of a conventional air filter for motor vehicle engines. Such a filter may comprise a tubular sleeve portion 8 adapted to be attached in a conventional manner to the intake of a carburetor, and a filtering chamber F formed between the windowed upper regions 9 of the sleeve 8 and the windowed outer shell or cage 10 which has a bottom wall 11 terminating in a collar 12 receiving, and secured to, the sleeve 8.

The top of the filtering chamber F may be closed by a top wall 13 secured to the upper edge region of the shell 10, either detachably or permanently.

The lateral wall of the shell 10 and the upper region 9 of the sleeve 8 may be provided with relatively large openings or windows 14 separated by web portions 15 between which the concentric rings 16 of filter fabric are confined.

Referring now to Fig. 3, each ring or layer of filter fabric may comprise a series of equi-distantly spaced, thin, narrow, sheet metal vanes 17, secured in spaced parallel relationship by spaced pairs of warp members 18 between which the vanes 17 are woven.

The warp members 18 are of metal wire, and in the form shown in Fig. 3, they are arranged in crossed zig-zag relationship, each warp member engaging first the edge of one vane 17, then extending diagonally across the space between said vane and the adjacent vane and engaging the opposite edge of the next adjacent vane, etc. Where the warp members engage the edges of the vanes, they are bent sharply around said edges, as at 19, so as to securely engage said edges against slippage with respect to the warp members.

Being of metal wire, tape or the like, the warp members 18 will retain the zig-zag shape that they receive during the weaving operation, so that the vanes 17 will be permanently secured in equi-spaced relationship.

In the filter, the vanes are arranged with their longitudinal axes at right angles to the direction of air flow as indicated by the arrow 20 in Fig. 2, and preferably parallel to the axis of the sleeve 8, so as to facilitate the curving of the fabric into cylindrical ring shape.

In weaving the fabric, the vanes 17 are arranged with their respective planes parallel to each other and extending transversely and diagonally with respect to the general plane of the fabric, that is, they define angles somewhat divergent from 90° with respect to said plane. In arranging the various rings 16 of filter fabric in the filter chamber F, each alternate ring is reversed with respect to the rings on either side of it, so that the inclination of its vanes is in a direction opposite to that of the vanes in the adjacent rings. This reversal of inclination is indicated in Figs. 1 and 3. The reversal of the rings necessary to produce the arrangement, may be secured by simply turning every other ring end for end with respect to its neighbors.

Each of the rings 16 has a circumference different from that of the adjacent rings, and as a result, the arrangement of the air passages 21 formed between the slats 17 of one ring with respect to the air passages 21 of the adjacent ring, will progressively vary around the circumference of the filtering chamber, without in any way affecting the uniformity of size of the passages. This progressive variation in register assures against the possibility of the edges of the vanes in one ring registering with the edges of the vanes in an adjacent ring, except in isolated instances.

A filter constructed in accordance with my invention has a plurality of series of parallel or substantially parallel fluid passages, the passages of one series being inclined with respect to the passages of the next adjacent series, and there being a progressive variation in register between the edges of the vanes forming the passages of one series and the edges of the vanes of the adjacent series, so that the fluid streams flowing through one series of passages may impinge against the edges and slanting faces of the next adjacent series of vanes, and may be caused to change direction or to impinge upon the next series of vanes, parallel to the first, in a similar manner.

The rings 16 of filter fabric may be coated with an appropriate substance for collecting dust, such as a heavy oil. The dust particles carried by the air streams through one series of passages 21, will, upon impinging against the coated surfaces of the vanes of the next series, adhere to said coated surfaces and be thereby removed from the air. By the time the air has completely passed through the filter, all the dust will have been removed in this manner.

When the collection of the dust in the filter has become so large as to materially lower the efficiency of the filter in passing air, it may be cleaned by washing in some appropriate cleaning fluid, such as gasoline.

The invention provides easier cleaning than is possible with conventional filters in that the uniform spacing the vanes 17 assures against any dust particles becoming wedged in the material of the filter.

The dimensions of the vanes 17 and the air passages 21, as illustrated in Fig. 1, are exaggerated with respect to the dimensions of the shell 10 and sleeve 8, in order more clearly to illustrate the invention. In practice, however, the dimensions of the vanes 17 and passages 21 will be considerably smaller in proportion to the dimension of the filter as a whole, than as shown in Fig. 1. For example, the vanes 17 may be spaced apart a distance between 0.0625 and 0.125 inches. The width of the vanes 17 may be within approximately the same range. These figures are given merely for purposes of illustration, however, and are not to be taken as limiting the scope of the invention.

By arranging the vanes 17 parallel to the axis of the sleeve 8, it is possible easily to form the strips of material into ring shape without materially disturbing uniform relationship between the vanes. The web members 18 readily adapt themselves to the curved shape, and the only change in structure that takes place during the curving is a slight opening of the angles of the web members which face outwardly, and a slight closing of the inwardly facing angles of the web members, accompanied by a slight divergence of the vanes 17 in a radially outward direction.

The chief advantage of the invention, as hereinbefore noted, is in the uniformity of spacing between the vanes 17, producing a uniform dust-arresting ability of maximum efficiency, combined with maximum air transmitting capacity. The edges of the vanes 17 offer very little resistance to the passage of air. The same is true of the wire warp members 18, which are relatively widely spaced apart as shown in Fig. 2. Instead of a haphazard arrangement of surfaces, some completely parallel to the general radial direction of movement of the air, and others at right angles thereto and obstructing the passage of air, my invention provides a uniform inclination of the walls of the passages, in directions which deviate from the general direction of air passage just sufficiently to cause the air currents to follow a tortuous path of sufficient variation in direction to cause the dust particles to be thrown against the inclined sides of the vanes.

Another distinct advantage of the invention is the forming of the filtering material into individual rings having sufficient rigidity, particularly in a direction parallel to their axes, and yet flexible circumferentially, so that assembly may be accomplished by simply slipping the rings into place between the cylindrical case member 10 and the sleeve 8.

Another advantage of the invention resides in the progressive variation in register of the edges of the vanes of one ring with respect to those of the adjacent ring, so as to assure that at least a major percentage of the vanes of one ring will be out of register with the vanes of the adjacent ring, whereby the air current flowing through the passages of one ring will be divided by impingement against the edges of the next ring. This splitting of the air current increases the efficiency of dust separation.

Another advantage of the invention arises from the arrangement of the innermost series of passages 21 so that the air streams passing therethrough are directed uniformly to one side of the center of the sleeve 8, thereby producing a vortical swirl of air in the sleeve 8 which facilitates the mixture of the air with the vaporized gasoline of a carburetor and speeds up the passage of air through the filter.

The vanes 17, instead of being flat, as in Fig. 3, may be curved around axes parallel to their longitudinal axes, as indicated at 17a in Fig. 5. The vanes 17a have a considerably greater longitudinal rigidity than the flat vanes 17.

Where curved vanes, such as those shown in Fig. 6 are employed, the edges of the vanes may be disposed in planes at right angles to the general plane of the fabric. By arranging alternate layers of the fabric with the vanes curving in opposite directions (as shown in Fig. 6), the tortuous passage effect is secured without any general inclination of the slats.

In Fig. 6, I have shown the invention embodied in a flat type air filter, such as is suitable for use in connection with air conditioning systems, the layers 16a of filter fabric being arranged flat and in face to face contact with each other, and suitably mounted in a channeled frame 23. If the dimensions of the filter are not too large, it may be possible to construct a filter of this type without employing any grid to support the exposed surfaces of the outer layers 16a, as is customary in conventional filters such as spun glass filters. This is true particularly where the type of material shown in Fig. 5 is employed.

It is understood that the foregoing description is merely illustrative of preferred embodiments of my invention, and that the scope of the invention is not to be limited thereto, but is to be determined by the attached claims.

I claim:

1. In a fluid cleaner, a plurality of flexible superposed sheets of filter material comprising substantially parallel flat wires inclined at an angle to the plane of the material, and spaced round wires retaining the flat wires in parallel spaced relation, the flat wires defining passages that are at a slight angle to the direction of travel of fluid passing through the filter.

2. In a fluid cleaner, a plurality of flexible superposed sheets of filter material comprising substantially parallel flat wires inclined at an angle to the plane of the material and spaced round wires retaining the flat wires in parallel spaced relation, the flat wires defining passages that are at slight angles to the travel of fluid passing through the filter, and the angle of the passages in one sheet being opposite to the angle of the passages in the adjacent sheets.

LOUIS B. BERG.